UNITED STATES PATENT OFFICE.

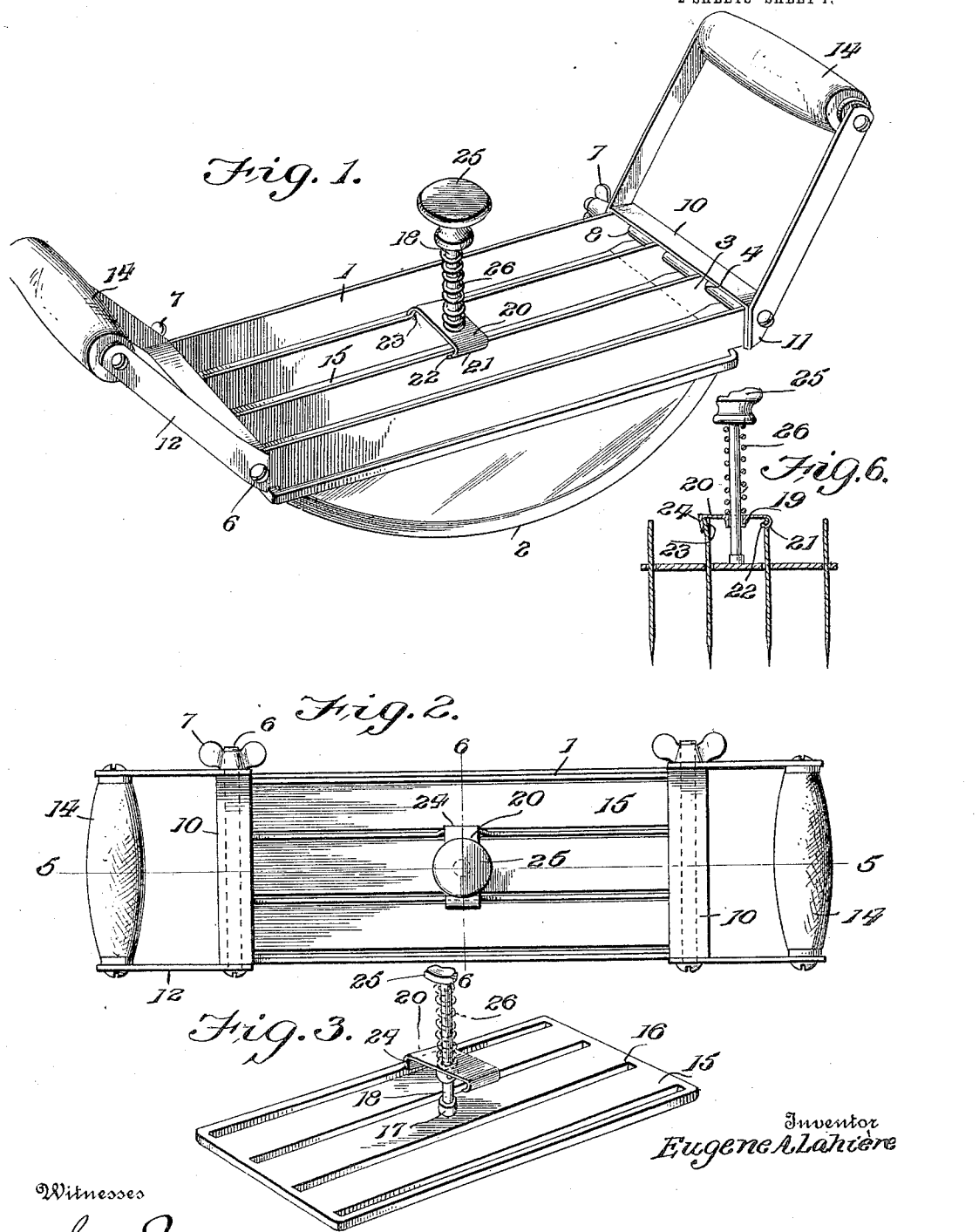

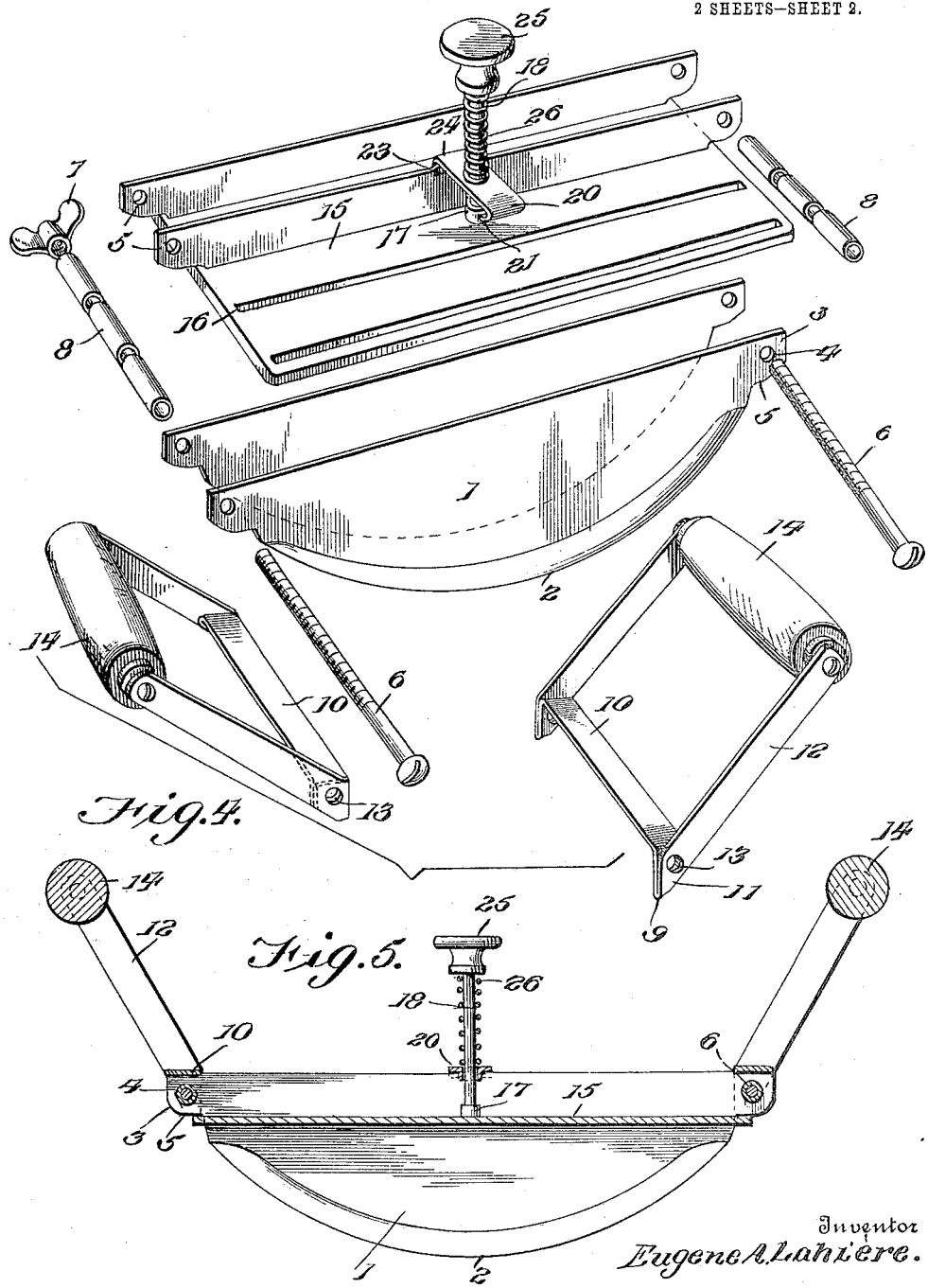

EUGENE A. LAHIÈRE, OF WASHINGTON, DISTRICT OF COLUMBIA.

MEAT-CHOPPER.

1,110,946.　　　Specification of Letters Patent.　Patented Sept. 15, 1914.

Application filed March 12, 1914. Serial No. 824,232.

*To all whom it may concern:*

Be it known that I, EUGENE A. LAHIÈRE, a citizen of France, residing at Washington, in the District of Columbia, have invented certain new and useful Improvements in Meat-Choppers, of which the following is a specification.

This invention relates to meat choppers, and has as its object to provide a meat chopper which may be conveniently employed, and which will be highly efficient in use, the same being so constructed that the piece of meat to be cut, may be divided into small pieces without a prolonged chopping operation.

The chopper embodying the present invention is of that type, including spaced blades having curved cutting edges, and the invention aims to so arrange the handles with relation to the blades that the chopper may be rocked as the chopping operation progresses, so as to make relatively long cuts in the piece of meat being chopped, and this without tiring the wrists of the user of the device.

Another aim of the invention is to provide, in connection with a meat chopper of the class described, novel and highly efficient means for scraping and cleaning the blades of the chopper at any time during the chopping operation. In this connection the invention further aims to so construct the cleaning means, and so assemble the same with the chopper proper, that the cleaning device may be readily removed when it is desired to clean the same, and as readily replaced, and both without the use of any tools.

Another aim of the invention is to so construct the blade scraping and cleaning device that normally the cleaning member thereof will be held in such position as not to interfere in any way with the operation of the chopper, the means being adapted to return the said cleaning member to normal position after it is actuated and released.

Another aim of the invention is to so mount the blades of the chopper that they may be readily removed and individually sharpened, this feature also adapting the chopper to have all of its several parts thoroughly cleaned, as may become necessary.

In the accompanying drawings: Figure 1 is a perspective view of the chopper embodying the present invention. Fig. 2 is a top plan view thereof. Fig. 3 is a perspective view of the cleaning device separated from the chopper proper. Fig. 4 is a group perspective view, illustrating the parts of the chopper disassembled. Fig. 5 is a vertical longitudinal sectional view on the line 5—5 of Fig. 2. Fig. 6 is a vertical transverse sectional view on the line 6—6 of the said Fig. 2.

The blades of the chopper are indicated by the numeral 1, and each blade is of segmental form, its curved cutting edge being indicated by the numeral 2. Each blade is provided at each end of its back or upper edge with an ear 3 formed with an opening 4, and the lower edges of the ears 3, which ears occupy the same plane as the body of the blade, constitute shoulders 5, the purpose of which will be presently explained. The blades may be of any desired number, and they are secured together in assembled relation by means of bolts 6, each having threaded thereon a thumb nut 7. The bolts 6 are inserted through the openings 4 in the ears 3, one of the bolts being located, of course, at each end of the series of blades, and in order that the blades may be properly spaced, spacing sleeves 8 are provided and are fitted upon the bolts 6 between each two of the blades. It will now be apparent that when the bolts have been fitted through the openings 4, and when the spacing sleeves 8 have been properly fitted upon the bolts, the thumb nuts 7 may be applied to the bolts and tightened so as to clamp the blades in their assembled relation.

Each handle of the chopper is preferably formed in part from a suitable length of bar-metal, of a desired thickness, and width, the metal being folded at the opposite sides of its middle, as at 9, so as to form a flat connecting portion 10, depending ears 11 and spaced side members 12. The ears 11 are formed each with an opening 13 and the handle members are so assembled with the blades that their connecting portions 10 will rest flat upon the upper edges of the blades, or, more specifically, the ears 3, and with the ears 11 projecting downwardly beside the ears 3 of the end blades of the series. With the parts thus assembled, the openings 13 will register with the openings 4 and, consequently, the bolts 6 will serve to secure the handles to the blades as well as to secure the blades in assembled relation. The spaced portions 12 of the handles project upwardly and outwardly at an angle with respect to the backs of the blades and support between their upper ends, hand grips 14, which may be grasped for the purpose of operating the chopper.

The cleaning device, heretofore mentioned, comprises a cleaning member in the form of a plate 15, which is substantially rectangular and which is formed with a series of longitudinally extending parallel slots 16, which are of a length to receive the blades 1, in the manner illustrated in Figs. 1, 2 and 6 of the drawings. Each slot is of a width but very slightly greater than the thickness of the blade received therein, so that as the plate 15 is moved up and down upon the blades, the walls of the slots will scrape the sides of the blades and thereby remove from the blades any pieces of meat adhering thereto. The plate 15 is provided upon its upper side, between the two middle slots 16 of the series, with a threaded socket 17, into which is fitted the lower end of a plunger stem 18. The stem 18 is fitted for sliding movement through an opening 19 in a bearing plate 20, which plate is supported upon the upper edges of the two middle blades, in a manner which will now be explained. The plate 20 at one end is bent to substantially hook form, as indicated at 21, and this end of the plate is pivotally fitted into a slot 22 formed in one of the said blades near the upper edge thereof. The other one of the two middle blades has its upper edge portion, at a point opposite the slot 22, struck out to form a keeper 23 and the other end of the said plate 20 is overturned to form a locking portion 24, adapted to engage with the keeper 23 in the manner clearly shown in Fig. 6 of the drawings. The plunger 18 is provided at its upper end with a knob or handle 25 against which pressure may be exerted for the purpose of sliding the plunger downwardly through the opening 19. A spring 26 is fitted upon the plunger and bears at its upper end against the under side of the knob 25 and at its lower end upon the plate 20, this spring serving to yieldably hold the plunger elevated and, consequently, hold the plate 15 in the position shown in Figs. 1, 5 and 6 of the drawings.

From the foregoing description of the invention, it will be understood that in the use of the device, the hand grips 14 are to be grasped, whereupon the device may be given a chopping motion in the usual manner. When it is desired to clean or scrape the blades, so as to remove therefrom any particles of meat adhering thereto, downward pressure is exerted against the knob or handle 25, thereby lowering the plunger and cleaner plate 15 against the tension of the spring 26. Of course, when the knob is relieved of pressure, the spring will immediately act to move the cleaner plate upwardly until it rests beneath the shoulders 5, in which position it will be normally supported. Should it be desired to disconnect the cleaning device from the chopper proper, the locking end 24 of the plate 20 may be swung upwardly out of engagement with the keeper portion 23, after which the pivot end 21 of the said plate may be disengaged from the slot 22. The plate 20 may then be turned about the plunger, as a pivot, until it has assumed a position at right angles to that shown in Figs. 1, 2 and 6, in which position, being of a width less than the distance between the two middle blades, it may pass downwardly between the said blades. It is, of course, necessary that the knob or handle 25 be of a diameter less than the distance between the two middle blades, in order that it too may pass between them, as the cleaning device is being removed.

While the invention is particularly well adapted for use as a meat chopper, it will be understood, of course that it may be employed as a vegetable chopper, and that it may be used either in connection with a chopping table, or a chopping bowl.

Having thus described the invention, what is claimed as new is:

1. In a chopper of the class described, blades provided at their ends with openings, spacing sleeves disposed between the blades, bolts secured through the said openings in the blades and through the spacing sleeves and holding the blades in assembled relation, and handles each provided with spaced portions and a connecting portion connecting the portions of the handles extending transversely above the ends of the blades and the said spaced portions projecting at their lower ends beside the end ones of the blades and having the said bolts secured through their said ends, the cutting edges of the blades being curved and the handles being inclined upwardly and outwardly from the said blades.

2. In a chopper of the class described, blades provided at their ends with openings, spacing sleeves disposed between the blades and registering with the openings, a handle including spaced portions, a grip and a connecting portion extending between the lower ends of the spaced portions, the said handle further including ears located one at each end of the connecting portion and having openings registering with the openings in the outer ones of the blades, and bolts secured through the openings in the blades, through the spacing sleeves and through the said ears upon the handles, the connecting portions of the handles resting upon the backs of the blades.

3. In a device of the class described, spaced blades, a cleaner plate having slots through which the blades project, the blades having shoulders against which the said cleaner plate is arranged to normally rest, a plunger connected with the plate, and a spring assembled with the plunger and normally holding the same in elevated position and with the plate in contact with the said shoulders.

4. In a device of the class described, spaced blades, a cleaner plate having slots through which the blades project, a supporting plate removably mounted upon the backs of the two adjacent ones of the blades, a plunger working through the said supporting plate and connected with the cleaner plate, and means yieldably holding the cleaner plate in elevated position, the supporting plate being rotatable upon the plunger, and being of a width less than the distance between the said blades, whereby to permit of the removal of the cleaner plate and its associated parts from the chopper proper.

5. In a device of the class described, spaced blades, one of said blades having its back formed with a slot and the other blade being provided with a keeper, a supporting plate having one end overturned and pivotally and removably fitted in the said slot, the other end of the supporting plate being provided with a latch portion engageable with the keeper, a cleaner plate having slots through which the blades project, a plunger connected with the cleaner plate and operable to move the said plate up and down upon the blades, and a spring upon the plunger yieldably holding the same in elevated position, the supporting plate being rotatable upon the plunger and of a width less than the distance between the said blades.

In testimony whereof I affix my signature in presence of two witnesses.

EUGENE A. LAHIÈRE. [L. S.]

Witnesses:
SAMUEL A. ACKER,
JOSEPH C. ZIRKLE.

---

Copies of this patent may be obtained for five cents each, by addressing the "Commissioner of Patents, Washington, D. C."